United States Patent [19]
Van Huis

[11] 3,731,852
[45] May 8, 1973

[54] FEED RETURN WHEEL FOR ANIMAL FEEDERS

[75] Inventor: Robert L. Van Huis, Zeeland, Mich.
[73] Assignee: U. S. Industries, Inc., New York, N.Y.
[22] Filed: Sept. 22, 1971
[21] Appl. No.: 182,903

Related U.S. Application Data

[62] Division of Ser. No. 41,254, May 28, 1970, Pat. No. 3,656,158.

[52] U.S. Cl.....................................222/318, 198/62
[51] Int. Cl............................................G01f 11/06
[58] Field of Search......................198/62; 74/243 C; 222/318, 367-369

[56] References Cited

UNITED STATES PATENTS

| 3,272,400 | 9/1966 | Van Huis | 222/318 |
| 3,068,711 | 12/1962 | Even | 74/243 C |

FOREIGN PATENTS OR APPLICATIONS

| 242,584 | 1/1912 | Germany | 222/369 |

*Primary Examiner*—Richard E. Aegerter
*Attorney*—Daniel Van Dyke

[57] ABSTRACT

A feed return wheel having a feed compacting surface and a chain-engaging sprocket, the sprocket being formed integrally with the surface and the surface being provided with spaced raised protrusions for positively engaging returned feed to cause the latter to mix with fresh feed.

18 Claims, 4 Drawing Figures

PRIOR ART

PATENTED MAY 8 1973 3,731,852

3,731,852

FEED RETURN WHEEL FOR ANIMAL FEEDERS

This is a division of application Ser. No. 41,254 filed May 28, 1970, now U.S. Pat. No. 3,656,158.

BACKGROUND OF THE INVENTION

Automatically operated feeding equipment such as is utilized for poultry cages requires an arrangement by which unconsumed feed is returned to the feed hopper for mixing with fresh feed. The mechanism which accomplishes this must be designed in such a fashion as to prevent the jamming of the returning feed upstream from the hopper such as would occur if the returning feed builds up at the hopper entrance. The mechanism also must insure that the returning feed is forced up into the hopper in a mixing action so that fresh feed will move into the feeding system along with the returned feed.

An example of such a mechanism is shown in U.S. Pat. No. 3,272,400. The device therein disclosed features a cylinder which compacts the feed and a sprocket which engages the feed chain so that the movement of the feed chain will rotate the sprocket and therefore the cylinder. The sprocket is a separate element which is slipped over the cylinder and thereafter joined to the cylinder such as by welding.

Devices constructed in accordance with the teachings of this patent have received wide commercial acceptance and function well. The mode of fabrication and attachment of the sprocket is, however, relatively expensive. This invention concerns itself, thus, with a means for reducing this cost and, yet, providing a structure which will function in completely acceptable fashion.

SUMMARY OF THE INVENTION

The disclosure relates to a feed compacting and agitating wheel of the type which is used in a mechanism for returning unconsumed feed to the source of fresh feed and thereafter mixing the two together. Specifically, there is provided such a wheel wherein the teeth which are engaged by the feed chain are formed integrally with the wheel, the entire wheel being formed in such a manner as to insure that the returned feed does mix with the fresh feed. Thus, there is provided an improved feed compacting and feed agitating wheel having a feed contacting surface, a series of teeth spaced around the circumference of the surface, and a feed confining flange at each end. The improvement features the surface including means protruding from the surface for frictionally engaging the feed contacted by the surface, and further featuring the spaced teeth extending from the surface as an integral part thereof.

Accordingly, it is an object of the invention to provide a feed compacting and feed agitating wheel wherein the contacting surface of the wheel has the chain-engaging teeth formed integrally therewith.

It is a related object of the invention to provide such a wheel wherein means are provided on the feed contacting surface to insure that the wheel frictionally engages the feed.

It is yet another object of the invention to provide such a wheel which has been simplified in construction, thereby reducing the cost.

Other objects and advantages will become apparent upon reference to the following drawings and detailed discussion.

BRIEF DESCRIPTION OF THE DRAWINGS

FIG. 2 is a perspective view of the wheel constructed in accordance with the invention;

DESCRIPTION OF THE PREFERRED EMBODIMENT

Figure 1:
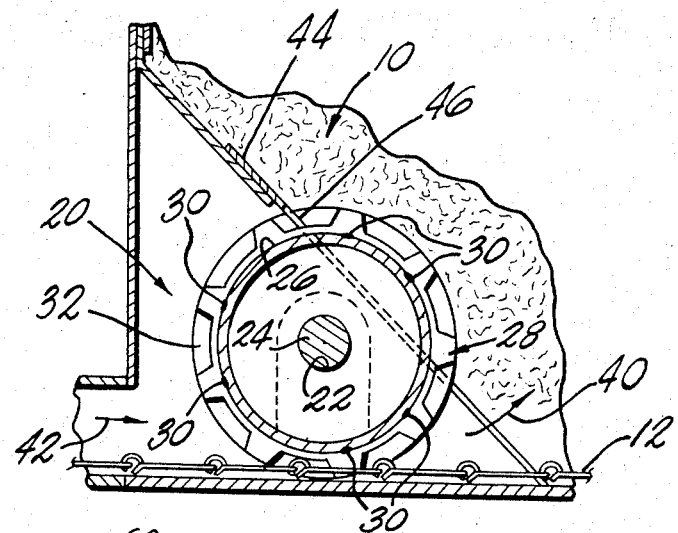
FIG. 1 is a fragmentary elevational view in section illustrating the feed return mechanism with which the invention is utilized, and specifically illustrating the prior art feed compacting and feed agitating wheel.

The invention concerns a feed compacting and feed agitating wheel such as is utilized to return unconsumed poultry feed or other animal feed to a hopper 10 wherein the unconsumed feed is mixed in with fresh feed prior to the feed being recirculated by a conveyor chain 12. FIG. 1 illustrates this environment along with the feed compacting and feed agitating wheel 20 disclosed in my above-identified U.S. patent. That wheel features a mounting aperture 22 which accommodates a mounting post 24, the wheel being provided with a cylindrical surface 26 to compact and engage the returning feed. The wheel is driven by a sprocket 28 which is engaged by the conveyor chain 12, the sprocket being separately formed and spot welded as at 30 to the cylindrical surface 26. A flange or end plate 32 is attached to each end of the cylindrical wheel 20 to assist in confining the unconsumed feed returned by the wheel 20. A plate 44 with a groove 46 accommodating the sprocket 28 prevents feed from falling upstream of wheel 20. In operation this structure mixes returned unused feed in the manner indicated by arrow 40, the chain 12 moving as indicated by the arrow 42 to rotate the wheel 20 counterclockwise (FIG. 1).

Figure 3:
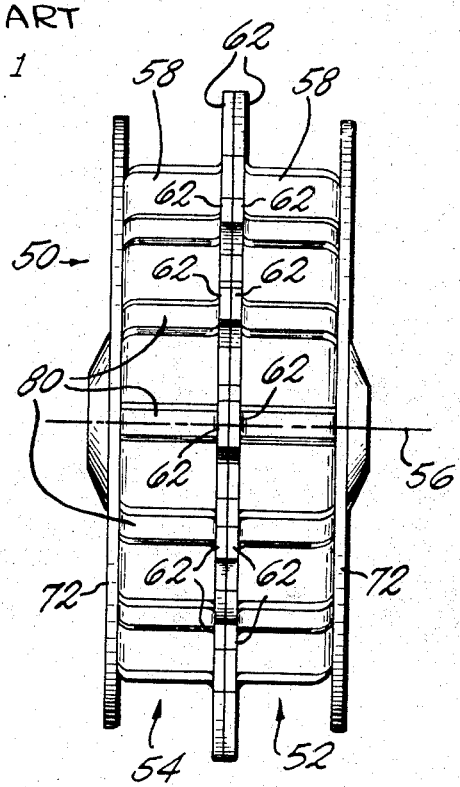
FIG. 3 is a front elevational view of the wheel shown in FIG. 2.
Figure 4:
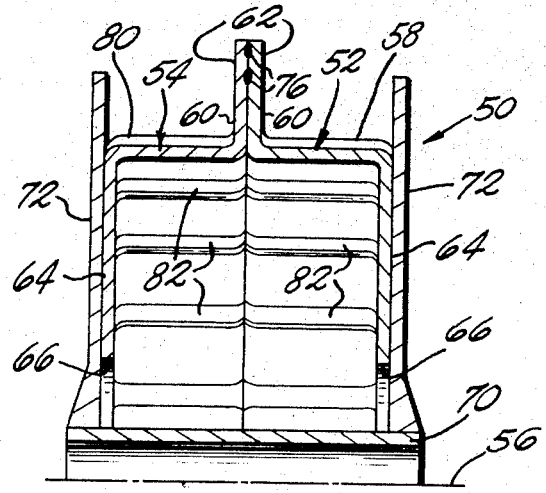
FIG. 4 is a fragmentary elevational view similar to FIG. 3 but illustrating the wheel in section.

In accordance with one aspect of the invention, the feed compacting and agitating wheel has been redesigned so as to form the sprocket teeth integral with the feed contacting cylinder, as opposed to a separate piece which is separately welded to a cylinder. Referring now to FIGS. 2 through 4, the redesigned wheel 50 comprises two annular dish-shaped elements 52 and 54 (FIG. 4) each of which has an axis of rotation 56. Each of the annular elements 52 and 54 also has a feed compacting and contacting surface 58 which makes up the cylindrical surface of the wheel 50. Extending outwardly at the mating edges of the surfaces 58 for each of the elements 52 and 54 is a rim 60 which defines the maximum diameter of each of the elements. Each of the rims 60 is provided with a portion 62 which defines the teeth of the sprocket. Preferably, each of the portions 62 defines one-half of each of the teeth of the sprocket, and the surfaces 58 of the elements extend longitudinally along the axis 56 from the teeth the same distance so as to approximately center the sprocket teeth upon the wheel 50. This is readily accomplished by forming the annular elements 52 and 54 identically, so that each provides approximately one-half of the feed contacting surface 58 and one-half of the sprocket teeth. One set of dies, thus, can form both elements 52 and 54.

Each of the elements 52 and 54 is provided with an inner rim or lip 64 which extends in a direction opposite from the outer rim 60 and in a plane parallel thereto (FIG. 4). The rims 64 are each provided with an opening 66, which must be of a sufficient diameter to accommodate a bearing 70. Flanges 72 are spot-welded as at 74 (FIG. 2) to the inner rims 64 and support directly the bearing 70. As shown, the flanges 72 are slightly less in diameter than the rims or sprocket 60. However, this relative difference in diameter can be changed if desired depending upon the particular operating environment.

The wheel 50 is assembled by positioning the elements 52 and 54 in matching abutment and then spot-welding the teeth portions 62 of the rims 60 as at 76. The flanges 72 are then spot-welded to the inner rims 64, the bearing 70 being attached to the flanges 72.

It has been discovered that when the sprocket teeth are thus formed integrally with the feed contacting cylinder, there is some tendency for the surface 58 and flanges 72 not to sufficiently frictionally engage the feed so as to force it to move in the direction of the arrow 40 (FIG. 1). Thus, in accordance with another aspect of the invention, there is provided a series of raised protrusions or ribs 80 spaced along the surface 58 of each of the annular elements 52 and 54. These ribs 80 extend outwardly from the surface 58 and may be formed parallel to the axis 56 of the elements. However, the ribs 80 need not be parallel to that axis, nor need they have the exact configuration as shown. Preferably, each of the ribs 80 does extend from the rim 60 to approximately the edge of the cylindrical surface 58 defined by the inner rims 64 (FIG. 3). As is evident in FIG. 4, the ribs 80 are integral parts of the surface 58, having been stamped into the annular elements 52 and 54 during the formation thereof so as to form the depressions 82.

It will be readily appreciated that the construction of the wheel 50 is greatly simplified due to the elimination of the steps of forming the sprocket as a separate component and thereafter assembling the sprocket to the cylinder.

The operation of the wheel 50 is the same as the prior art wheel 20 which it replaces, with the exception that the ribs 80 assist in providing a positive engagement of the returning feed so as to insure that it is forced upwardly in the direction of arrow 40 to provide the desired mixing action. The plate 44 extends to the wheel 50 so that the edges of the plate just touch the top surface of the ribs 80, thus permitting the plate 44 to remain rigidly in place.

Although the invention has been disclosed in connection with a preferred embodiment, it is not intended that it be limited thereto. Rather, it is intended that the invention cover all alternate arrangements, alternative embodiments, and equivalents as may be included within the scope of the following claims.

The embodiments of the invention in which an exclusive property or privilege is claimed are defined as follows.

1. In an improved feed hopper for use in automatic feeding equipment in which a conveyor means transfers feed from the outlet of the hopper throughout a feeding trough and back for a continuous supply of feed; said hopper having an enclosure, a cylindrical compacting element rotatably mounted within said enclosure, means for driving said element, and means for engaging said driving means, the improvement comprising: said cylindrical compacting element having an annular feed contacting surface and a series of raised protrusions being spaced circumferentially around said surface and extending generally transversely across said surface, at least one of said protrusions extending from said means for engaging said driving means to approximately at least one outer edge of said surface.

2. The feed hopper according to claim 1 wherein said means for engaging said driving means include a series of teeth spaced around the circumference of said surface.

3. The feed hopper according to claim 2, wherein said surface and said teeth consist of two abutting annular elements each of which provides approximately one-half of said surface and said spaced teeth, said teeth extending outwardly around at least a portion of one edge of said elements to define the maximum diameter of each said element, said elements being joined together at said maximum diameters, whereby when joined together said annular elements form said teeth as an integral part of said surface.

4. The feed hopper according to claim 3, wherein said surface and said teeth comprise two identical dish-shaped elements.

5. The feed hopper according to claim 4, wherein the bases of said dish-shaped elements have joined thereto said flanges.

6. The feed hopper according to claim 2, wherein said surface and said teeth include two annular elements each of which has an axis of rotation and provides approximately one-half of said surface, said spaced teeth extending around at least a portion of one edge of each of said elements to define the maximum diameter of each of said element, said elements being joined together at said maximum diameters, whereby when joined together said annular elements form said teeth as an integral part of said surface.

7. The feed hopper according to claim 6, wherein said elements are identical, and said integral teeth are approximately centered upon said surface.

8. The feed hopper according to claim 7 wherein each tooth portion on each of said elements comprises approximately one-half of each of said spaced teeth.

9. The feed hopper according to claim 6 wherein said series of raised protrusions include on at least one of said annular elements, a series of ribs extending outwardly from the surface portion of said one element parallel to the axis of said each element.

10. The feed hopper according to claim 9, wherein said ribs are an integral extension of said one surface portion.

11. The feed hopper according to claim 6 wherein said annular elements are joined by welding the two together at the portions thereof which form said spaced teeth.

12. The feed hopper according to claim 6 wherein each of said annular elements include a feed confining flange at each end thereof.

13. The feed hopper according to claim 12 wherein each of said elements include a lip extending inwardly toward the axis of said each element in a plane parallel to the plane of said spaced teeth, and wherein each of said flanges is joined to one of said lips.

14. A feed hopper for use in automatic feeding equipment in which a conveyor means transfers feed from the outlet of the hopper throughout a feeding trough and back for a continuous supply of feed; said hopper comprising an enclosure, a cylindrical compacting element rotatably mounted within said enclosure, said compacting element having a feed contacting surface and a series of teeth spaced around the circumference of said surface, said surface including a series of raised protrusions extending from said spaced teeth to approximately at least one outer edge of said surface.

15. The feed hopper according to claim 14 wherein said surface is cylindrical with at least one longitudinal axis of revolution, and wherein said teeth form a plane extending transverse to said axis.

16. The feed hopper according to claim 14 wherein said protrusions are ribs extending in both longitudinal directions along said surface from said teeth.

17. The feed hopper according to claim 16 wherein said ribs integrally extend from said surface in directions which parallel said axis of said wheel.

18. The feed hopper according to claim 17 and further including flanges at opposite ends of said surface extending out beyond the same, said flanges being shaped so as to confine the feed to a channel configuration.

* * * * *